United States Patent [19]

Podlas

[11] Patent Number: 5,512,616

[45] Date of Patent: Apr. 30, 1996

[54] TAPE JOINT COMPOUND COMPOSITION USING UNBORATED HYDROXYPROPYL GUAR

[75] Inventor: Thomas J. Podlas, Hockessin, Del.

[73] Assignee: Aqualon Company, Wilmington, Del.

[21] Appl. No.: 251,160

[22] Filed: May 31, 1994

[51] Int. Cl.[6] .................................................. C08L 3/02
[52] U.S. Cl. ................... 524/18; 524/43; 524/44; 106/197.1
[58] Field of Search ............................ 524/18, 43, 44; 106/197.1

[56] References Cited

U.S. PATENT DOCUMENTS

| | | | |
|---|---|---|---|
| 4,228,277 | 10/1980 | Landoll | 536/90 |
| 4,558,079 | 12/1985 | Desmarias | 524/43 |
| 4,826,970 | 5/1989 | Reid et al. | 536/66 |
| 5,102,462 | 4/1992 | Podlas | 106/181 |

*Primary Examiner*—Paul R. Michl
*Assistant Examiner*—John J. Guarriello
*Attorney, Agent, or Firm*—David Edwards

[57] ABSTRACT

An improved joint compound is provided that has from about 0.2 to about 0.9% of a thickener system selected from unborated hydroxypropylguar or a blend of an unborated hydroxypropylguar and 1–3% of a cellulose ether. This thickener system is either in dry form or as a fluid suspension. This joint compound is useful for the installation of wall board paneling in residential commercial, and industrial buildings.

22 Claims, No Drawings

5,512,616

TAPE JOINT COMPOUND COMPOSITION USING UNBORATED HYDROXYPROPYL GUAR

The present invention relates to compositions which incorporate a thickener system that includes an unborated guar useful as joint sealing materials for the installation of wallboard paneling in residential, commercial, and industrial buildings.

BACKGROUND OF THE INVENTION

Wallboard is the standard material used to erect interior walls in the construction of homes and buildings in the USA, Canada, and some other countries. Generally, wallboard is installed in large panels that are nailed and glued to the wall studs and fitted together until the wall section is covered. The joints where sections of the board are joined are covered with joint compound, then with tape, and then the taped joints and all nails and screws are covered with joint compound. Upon hardening, the joint compound is sanded smooth so that it is imperceptible under paint or other wallcovering.

Joint compounds generally contain a resinous binder, limestone, clay, mica, stabilizer, lubricant, and thickener as the principle ingredients that are mixed with water to form a workable mass that is applied to the wall by troweling. Over the past several years, many of the general components in joint compounds have undergone refinement for various reasons. For example, asbestos is no longer used in joint compounds for health reasons and different types of clays such as attapulgite clay, kaolin clay, bentunite and montmorillonite have been tried in different formulations.

The stabilizers and thickeners in the joint compounds have also undergone changes in order to try to improve the joint compounds. The typical water soluble polymers used to thicken and stabilize joint compounds are cellulose ethers, e.g., methylhydroxypropylcellulose (MHPC), hydroxyethylcellulose (HEC), and derivatives thereof. The cellulosic thickeners are chosen so as to impart excellent working properties to joint compounds. However, each of the common cellulosic thickeners often imparts one or more properties to a joint compound that need to be improved. For example, less than satisfactory sag resistance (so-called "body") occurs with MHPC; gelation that results in poor workability may occur with HEC. These undesirable characteristics of joint compounds are well known in the drywall finishing industry.

Guar has also been used to thicken joint compounds in the prior art with limited success. Although guar or substituted guars such as hydroxypropylguar (HPG) have been used, unsubstituted (underivatized) guars usually thickened excessively after relatively short periods of aging; excessive gelation is also common. When these guars are used, the joint compounds are at first acceptable; however, upon standing, the shelf-life is unacceptably short. It has been found that one factor that makes these guars unacceptable is the presence of borate.

Guars (underivatized and derivatized) are typically treated with borax in order to facilitate purification during their manufacturing process. Even small levels of borate in amounts above about 200 parts per million (ppm) will cause unacceptable thickening and syneresis in joint compounds over a period of time from several hours to days. As a matter of fact, borate at this level is intolerable in a joint compound formulation using guar as a thickener regardless of the source of the borate. Therefore, if the borate has not been removed from the guar or the formulation, a complexing agent must be added to the system to chemically complex the borate so as to render it inactive. Since borate is a naturally occurring element, it may be present in trace amounts from any of the ingredients that are found in nature.

U.S. Pat. No. 4,558,079 is an example of a patent that discloses the use of a guar derivative in a tape joint compound composition suitable for use with wallboard where at least one hydroxypropylhydroxyethylcellulose (HPHEC) having specified substitution levels is employed as the water retention aid and thickener. Blends of HPHEC are disclosed with (a) at least one cellulose ether, such as, hydroxyethylcellulose (HEC), hydroxypropylcellulose (HPC), methylcellulose (MC), methylhydroxyethyl cellulose (MHEC), and methylhydroxypropylcellulose (MHPC) or (b) a hydroxyalkylguar, such as hydroxypropylguar and hydroxyethylguar. This patent does not address the problem of borate contaminated guar.

No prior art was found that provides an alternative composition to improve the properties of tape joint compounds by providing an acceptable substitute, in toto or in part, for the cellulose ethers that are customarily used to thicken and modify the rheological properties of the joint compound using a guar derivative in the absence of borate.

SUMMARY OF INVENTION

The present invention relates to a joint compound composition having limestone, clay, binder, water, and a thickener as the main ingredients, the improvement comprises using from about 0.2 to about 0.9%, by weight based on the dry ingredients, of an unborated hydroxypropylguar or a blend of an unborated hydroxypropylguar and of cellulosic ethers. In the present invention, hydroxypropylguar (HPG) means either a HPG with a hydroxypropyl molar substitution (MS) of at least 0.3 or a mixed derivative additionally containing a lesser MS of a secondary substituent. A preferred secondary substituent is carboxymethyl.

The present invention further relates to a joint compound composition having limestone, clay, binder, water, and a thickener as the main ingredients, the improvement comprises using from about 0.2 to about 0.9%, by weight based on the dry ingredients, of a blend of a borated guar or hydroxypropylguar and a complexing agent or a blend of a borated guar or borated hydroxypropylguar, a complexing agent, and cellulose ethers.

DETAILED DESCRIPTION OF THE INVENTION

It has been unexpectedly found that the one factor that makes guars unacceptable is the presence of borate. It was observed that when unborated hydroxypropylguar (HPG) is used to thicken joint compounds, either as the sole thickener or in combination with cellulose ethers such as MHPC, HEC, and derivatives of HEC, the properties of joint compounds are considerably improved. The improvements obtained are functions of the particular cellulose ether used in conjunction with the HPG and of the types and levels of other joint compound ingredients. Inclusion of the HPG as a part of the thickener package, varying the type of cellulose ether, and varying the relative ratios of the HPG and cellulose ether are usually the only formula modifications needed to obtain the desired changes in joint compound properties. These improvements include, but are not limited to: less gelation, increased sag resistance, improved adhesion, creamier texture. With respect to 100% cellulose ether, less gelation is obtained when the blend is HPG and HEC. Improved sag resistance is obtained with HPG and methylhydroxypropylcellulose (MHFC).

If borate is present in a system (which can occur from other sources not associated with guar), it must be rendered inactive by taking other steps to insure its removal for assuring adequate joint compound properties. A complexing agent for borate should be included in the formulation. The amount of the complexing agent is dependent on the amount of borate present in the formulation. Since the steps of determining whether borate is present and determining the level of its presence are time consuming and expensive, borate-infected ingredients for the joint compound should be avoided. However, if borate cannot be avoided, a complexing agent must be used to achieve the improvement of the instant invention. The amount of complexing agent that should be present in the formulation has a lower limit of 0.2%, preferably 0.4%, and most preferably 0.6% based on the thickener composition. The upper limit for the complexing agent is normally 15%, preferably 13%, with the most preferred upper limit being 10%.

Examples of complexing agents are sorbitol, mannitol, other polyhydric alcohols, and compounds with two or more hydroxyls capable of interacting with and complexing the active borate. The amounts to be used are functions of both the efficiency of the complexing agents and the amount of borate. The amount of complexing agent is dependent on the amount of borate in the composition and the efficiency of the complexing agent.

Other characteristics that are needed of the guar, other than being free of borate, for acceptability as a joint compound thickener, are: (i) hydroxypropylation of the guar gum, so that the hydroxypropyl molar substitution (HPMS) is at least about 0.30 (HPMS is the average number of moles of hydroxypropyl substitutent groups present per anhydroglucose (mannose or galactose) unit of the guar molecule) and (ii) a 1% aqueous viscosity in the range of 500–2500 cps as measured at 25° C. on a Brookfield rotational viscometer at 30 rpm.

Polymeric Thickener/Stabilizer:

The thickener includes either a physical blend of a nonionic, water soluble cellulose ether and HP Guar, or 100% of HF Guar. Illustrative cellulose ethers are HEC, HPC, MHPC, HPHEC, and hydrophobically modified hydroxyethylcellulose (HMHEC). U.S. Pat. Nos. 4,338,277, 4,243, 802 and 4,826,970 describe some suitable HMHEC products. The viscosity of the cellulose ether in water at 1% total solids at 25° C. as measured with a Brookfield L or R visometer at 6 rpm is from about 300 to 10,000 cps. Preferably, the cellulose ether has a viscosity from about 500 to 7500 cps at 1% solids, and most preferably from about 750 to 5000 cps at 1% total solids at 25° C. In addition, blends of the above cellulose ethers may also be employed. Hydroxyethylguar may also be used in place of hydroxypropylguar.

The HP Guar will have a hydroxypropyl molar substitution (HPMS) of from about 0.3 to about 2.0, with the preferred range being 0.3 to 1.0. In addition, the HPG must be substantially free of borate, which is usually intentionally added to guar products in order to control product swelling. The HP Guar must have an aqueous 1% Brookfield viscosity as described above of from 500 to 2500 cps.

The thickening system described in this Invention has also been found to be useful in improving the properties of tile adhesives, caulks, and other water based sealants.

Joint Compound:

Most commercial joint compound formulations contain limestone, clay, mica, resinous binder, thickener, lubricant and preservative in varying amounts. The resinous binder is normally a coalescable vinyl material, such as (poly)vinyl acetate and ethylene-vinyl acetate copolymer. Upon drying or curing of the joint compound, it forms a thin matrix to hold the limestone, clay and other components. When a fully formulated, ready-to-use mix is being prepared, the binder is usually added as an aqueous latex. With dry mixes that are diluted with water on-site, it is added as a spray-dried latex. Other materials that are useful as binders include, e.g., starch and casein. The binder concentration upper limit is normally about 5% by weight with 3% being preferred. It is normal that the lower limit be about 0.5% with 1% being the preferred lower limit.

Optionally, other additives may be included in the joint compound formulation. Cellulose fibers in various form can be used to increase the body of the composition so that application to a vertical wall without sagging or rundown may be facilitated. A typical joint compound will frequently also contain a dispersant and a defoamer. Talc is frequently included as a filler, in combination with limestone. The limestone concentration can be present in the joint compound over a wide range, with the upper limit being about 90% of the solids with the preferred being about 80%. The lower limit of the limestone concentration is normally 40% with the preferred low limit being 50%.

The clay concentration can have an upper limit of 10% in the joint compound with 3% being preferred. The lower limit of the clay can be 0.5% with 1% being preferred. Water in the joint compound can also have a wide range of concentrations depending on the application of the joint compound. The upper limit of the water can be 35% with 32% being preferred and the lower limit can be 25% with 28% being preferred. The thickener system can have an upper limit of 1.0% with 0.7 being preferred and 0.5% being most preferred; the lower limit of the thickener system is 0.1% with 0.2% being preferred and 0.3% being most preferred.

Additionally, the levels of the ingredients may be changed within the limits of applicability known to those skilled in the art. The basic ingredients of a joint compound with the preferred and most preferred ranges are as follows:

| Ingredient | Levels (%) | |
| --- | --- | --- |
| | Preferred | Most Preferred |
| Water | 25–35 | 28–32 |
| Limestone | 55–65 | 58–62 |
| Attapulgite Clay | 1–3 | 1.5–2.5 |
| Latex | 1.0–4.0 | 1.5–3 |
| Mica | 1.5–8 | 2.0–4.0 |
| Polymeric Thickener | 0.1–1.0 | 0.3–0.5 |
| Biocide(s) | 0.2–1 | 0.3–0.55 |

The invention is further illustrated by the following Examples. Parts and percentages are by weight, unless otherwise noted.

EXAMPLES

Standard Mixing Procedure

Joint compounds are prepared by combining all of the wet ingredients and mixing for about one minute to homogenize. A blend of all the solids is then added to the mixing bowl, with continued mixing. The entire mass is blended for a total of about 20 minutes.

This procedure may be modified by different manufacturers. For example, the latex can be added after the addition of the other ingredients. The mixing time of 10 to 20 minutes cannot be significantly decreased when thickeners in the dry state are employed. The full time is necessary to ensure complete hydration and uniform dispersibility of the thickener, as well as homogeneous dispersion of all the ingredients so that there is reasonable expectation that a state of equilibrium has been attained, assuring production of an acceptable, stable product.

This invention may be employed with joint compounds that are marketed as a dry powder, with water being added by the consumer at the time of use.

If it is desired to shorten the mix time for any reason, the thickener should be employed as an aqueous suspension. When the thickener is in the form of an aqueous suspension, this suspension is best added to the other ingredients that have already been added to the mix and mixed for a short time period (<1 minute). It will then be possible to prepare the joint compound with as little as 3 or 4 minutes of mixing, but no more than 5 to 8 minutes.

Examples of thickeners that have been used in fluid suspension are:

1) blends of HMHEC and HP Guar, ranging from 25% HMHEC and 75% HP Guar to 75% HMHEC and 25% HP Guar.

2) 100% HP Guar

HP Guars combined with either MHPC, or HEC, or blends thereof.

Essentially all thickeners and thickener combinations that can be used in dry form may be formulated into a fluid suspension.

The main advantages of using a suspension are decrease in cycle time, energy savings, and assurance that the thickener in suspension form will be totally dispersed even under low shear conditions.

Product Characterization:

To characterize the products prepared in the examples, the following evaluations were carried out.

Viscosity: Measured in Brabender units (B.U.) determined by ASTM C 474–67. Unless otherwise stated, the viscosities given in this communication are those obtained immediately after the joint compound was prepared.

Adhesion: By ASTM test C 474–67. Adhesion is rated by the following scale:

| % Coverage | Rating |
|---|---|
| ≧90% | 1. Most preferred |
| 70–90 | 2. Acceptable |
| 50–69 | 3. Borderline, not acceptable |
| <50 | 4. Totally unacceptable |

Appearance/Texture: Ratings are based on average findings of panel of testers for each sample and assigned as: (Very) Smooth vs. Grainy, and Creamy vs. Pasty, with very smooth and creamy being the most desirable.

Gelation (livering): Also defined as "memory" or "springback". Ratings are based on visual inspection of testers and assigned as: no gel (most desirable); very slight; slight; moderate, and heavy gel (unacceptable). The more pronounced the gelation, the more difficult it is to trowel and otherwise apply the joint compound to the substrate.

Using the standard procedure described above, joint compounds were prepared from the following formulation of Table I and II using thickener systems as set forth in Table III infra:

TABLE I

| Joint Compound Formulation From Dry Ingredients | |
|---|---|
| Ingredients | Weight % |
| Limestone (Georgia White No. 9, Georgia Marble Co.) | 61.5 |
| Attapulgite Clay (Gel B, The Milwhite Co.) | 2.0 |
| Latex Binder (Ucar 133, Union Carbide Corp., polyvinylacetate) | 2.0 |
| Mica (P80K, Unimin Corp.) | 2.88 |
| Propylene Glycol (Mobay Corp.) | 0.35 |
| Biocides (Troy Chemical Co.) | 0.05 |
| Thickener | 0.50 |
| Water | 30.72 |

TABLE II

| JOINT COMPOUND FORMULATION Using Aqueous Suspension Thickener | |
|---|---|
| Ingredient | Parts by Weight |
| Water | 45.89 |
| Epsom Salt | 30.5 |
| HP Guar | 13.8 |
| HMHEC | 9.2 |
| Lecithin | 0.5 |
| Biocide | 0.1 |
| Defoamer | 0.01 (or as needed) |

TABLE III

| No. | Thickener | Texture/ Appearance | Viscosity at 25° C., 1% (B.U.) | Adhesion | Gelation | Comments |
|---|---|---|---|---|---|---|
| 1 | 100% HP Guar with HPMS of 0.40 Viscosity of 1400 cps | Smooth and creamy | 540 | 2 | None | Without borate being present, HP Guar is acceptable |
| 2 | HP Guar of #1 with 200 ppm borate | Smooth and creamy initially; thick and hard in 24 hours - rubbery in 7 days | 560 initially Progressively increased to >1000 in 7 days | 2 | None initially, but progressively increased | Joint compound totally unusable in less than 7 days in presence of small amount |

TABLE III-continued

| No. | Thickener | Texture/ Appearance | Viscosity at 25° C., 1% (B.U.) | Adhesion | Gelation | Comments |
|---|---|---|---|---|---|---|
| 3 | 100% underivatized guar | Slightly pasty; a dry texture and feel in 1-2 weeks | 510 | 2 | Slight initially; heavy in 1 week | of borate underivatized alone is unacceptable |
| 4 | 60% underivatized guar 40% MHPC with 2% Brookfield viscosity of ca. 20,000 cps | Smooth and creamy - becoming pasty and slightly grainy in 2 weeks | 520 | 1 | Very slight inititally increasing with time | When underivatized guar is blended with cellulose ether, it still is unacceptable |
| 5 | 60% HP Guar (HPMS 0.4) and 40% HMHEC (AQU D-3082R) from Aqualon | Smooth and creamy | 540 | 1 | Very slight | Acceptable properties. HP Guar decreases gelation (see #9) |
| 6 | 60% HP Guar (HPMS 0.4) and 40% HEC | Smooth and creamy | 480 | 1 | Very slight, increasing to slight - moderate in 1 week | Acceptable properties. HP Guar decreases gelation (see #9) |
| 7 | 60% HP Guar (HPMS 0.4) and 40% MHPC | Smooth and creamy | 530 | 1 | Very slight | Acceptable properties. HP Guar improves sag resistance (more body) |
| 8 | 100% HMHEC | Smooth and creamy | 550 | 2 | Very slight | Control for #5 |
| 9 | 100% HEC | Smooth and creamu | 440 | 2 | Moderate | Control for #6 |
| 10 | 100% MHPC | Smooth and creamy but weak body | 550 | 1 | Slight | Control for #7 |
| 11 | 60% HP Guar & 40% HMHEC - Dry blend | Smooth and creamy | 540 | 1 | Very slight | Took 20 minutes to mix; at 8 minutes, a pasty joint compound with only a partially hydrated, partially dispersed polymer resulted |
| 12[a] | 23% - blend of 60% HP Guar and 40% HMHEC 30% - Epsom Salt 0.1% - Stabilizer (xanthan gum) 46.9% - Water | Smooth and creamy | 530 | 1 | Very slight | Only took 8 minutes to mix |

[a] The suspension as prepared in accordance with the procedure set forth U.S. Pat. Nos. 4,883,536 and 5,028,263. The polymer concentration in the joint compoun is 0.50% - total water in joint compound is the same. The level of limestone in the joint compound is reduced by the level of epsom salts in the suspension.

What is claimed:

1. In an improved joint compound composition having limestone, clay, binder, water, and a thickener as the main ingredients, the improvement comprising using from about 0.2 to about 0.9%, by weight based on the dry ingredients, of a thickener system selected from the group consisting of (i) an unborated hydroxypropylguar having less than 200 ppm of borate present and (ii) a blend of an unborated hydroxypropylguar and 1-3% of a cellulose ether.

2. The improved joint compound composition of claim 1 wherein the viscosity of the unborated hydroxypropylguar at 1% solids concentration at 25° C. is 500 to 2500 cps.

3. The improved joint compound composition of claim 1 wherein the cellulose ether is selected from hydroxyethylcellulose, hydrophobically-modified hydroxyethylcellulose, methylhydroxypropylcellulose, hydroxypropylhydroxymethylcellulose and blends thereof.

4. The improved composition of claim 1 wherein the hydroxypropylguar has a molar hydroxypropyl substitution of from about 0.3 to about 1.0.

5. The improved composition of claim 1 wherein the thickener system is present in the amount of from about 0.4 to about 0.7%.

6. The improved composition of claim 5 wherein the thickener system is present in the amount of 0.5%.

7. The improved composition of claim 1 wherein the thickener system is in the form of an aqueous fluid suspension comprising at least 15% polymer of (i) or in (ii), water, sufficient salt to prevent extensive hydration and swelling of the polymer prior to dilution of the suspension with more water, and a small amount of a stabilizer to prevent settling and hardening of the polymer solids.

8. The improved composition of claim 7 wherein the polymer is unborated hydroxypropylguar.

9. The improved composition of claim 7 wherein the polymer is a blend of 60% of unborated hydroxypropylguar and 40% of a cellulose ether.

10. The improved composition of claim 9 wherein the cellulose ether is selected from hydroxyethylcellulose, hydrophobically-modified hydroxyethylcellulose, methylhydroxypropylcellulose and blend thereof.

11. The improved composition of claim 1 wherein a complexing agent is added to the composition to guard against adventitious addition of borate.

12. In an improved joint compound composition having limestone, clay, binder, water, and a thickener as the main ingredients, the improvement comprising using from about 0.2 to about 0.9%, by weight based on the dry ingredients, of a thickener system selected from the group consisting of (i) a borated hydroxypropylguar having greater than 200 ppm of borate present and a complexing agent and (ii) a borated hydroxypropylguar, a complexing agent, and a cellulose ether.

13. The improved joint compound composition of claim 12 wherein the complexing agent is selected from the group consisting of sorbitol, mannitol, other polyhydric alcohols, and compounds with two or more hydoxyls capable of interacting with and complexing the active borate.

14. The improved joint compound composition of claim 12 wherein the viscosity of the borated hydroxypropylguar at 1% solids concentration at 25° C. is 500 to 2500 cps.

15. The improved joint compound composition of claim 12 wherein the cellulose ether is selected from hydroxyethylcellulose, hydrophobically-modified hydroxyethylcellulose, hydroxypropylmethylcellulose, and blends thereof.

16. The improved composition of claim 12 wherein the hydroxypropylguar has a hydroxypropyl molar substitution of from about 0.3 to about 1.0.

17. The improved composition of claim 12 wherein the thickener system is present in the amount of from about 0.4 to about 0.7%.

18. The improved composition of claim 17 wherein the thickener system is present in the amount of about 0.5%.

19. The improved composition of claim 12 wherein the thickener system is in the form of an aqueous fluid suspension comprising at least 15% polymer in (i) or (ii), water, sufficient salt to prevent extensive hydration and swelling of the polymer prior to dilution of the suspension with more water, and a small amount of a stabilizer to prevent settling and hardening of the polymer solids.

20. The improved composition of claim 19 wherein the polymer is (i).

21. The improved composition of claim 19 wherein the polymer is (ii) a blend of 60% of borated hydroxypropylguar and complexing agent and 40% of a cellulose ether.

22. The improved composition of claim 19 wherein the cellulose ether is selected from hydroxyethylcellulose, hydrophobically-modified hydroxyethylcellulose, hydroxypropylmethylcellulose, and blends thereof.

* * * * *

UNITED STATES PATENT AND TRADEMARK OFFICE
CERTIFICATE OF CORRECTION

PATENT NO. : 5,512,616

DATED : April 30, 1996

INVENTOR(S) : Thomas J. Podlas (CASE 12)

It is certified that error appears in the above-identified patent and that said Letters Patent is hereby corrected as shown below:

Column 3, line 45, replace "HF" with --HP--.

Column 5, line 48, replace " $\leq$ " with -- $\geq$ --.

Column 7, line 48, replace "compoun" with --compound--.

Signed and Sealed this

Seventh Day of January, 1997

Attest:

BRUCE LEHMAN

*Attesting Officer*      *Commissioner of Patents and Trademarks*